Feb. 28, 1928.
M. S. GLEASON
1,660,501
EDUCATIONAL GAME APPARATUS
Filed Sept. 3, 1927  2 Sheets-Sheet 1
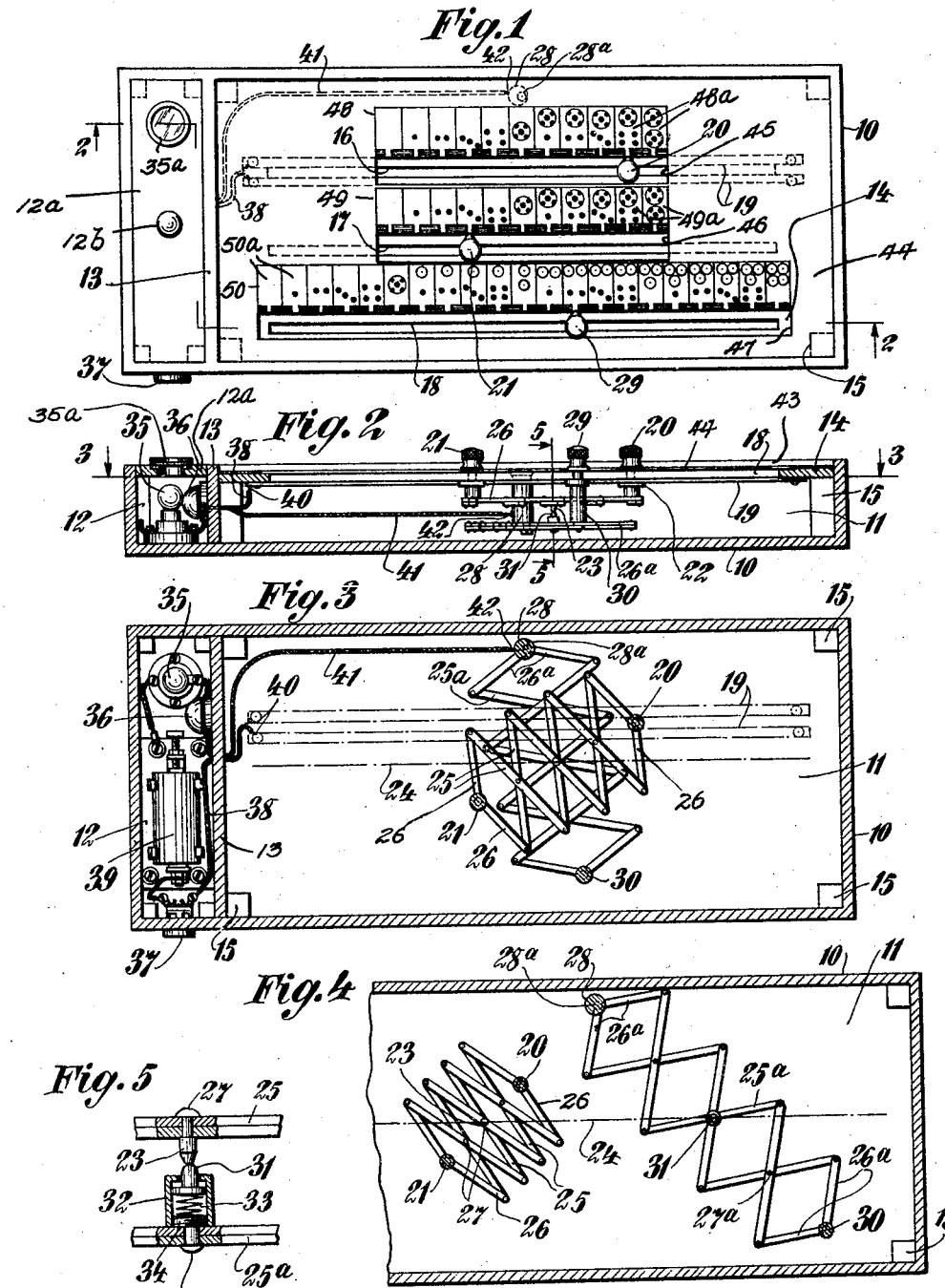

Feb. 28, 1928.
M. S. GLEASON
1,660,501
EDUCATIONAL GAME APPARATUS
Filed Sept. 3, 1927     2 Sheets-Sheet 2
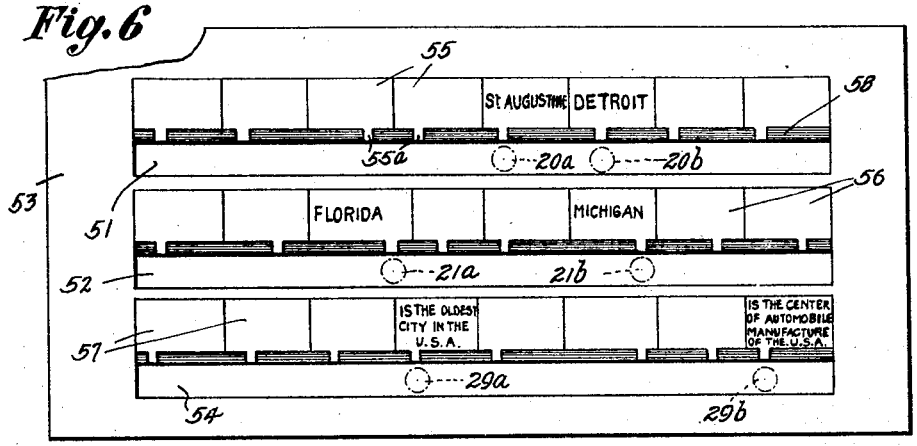
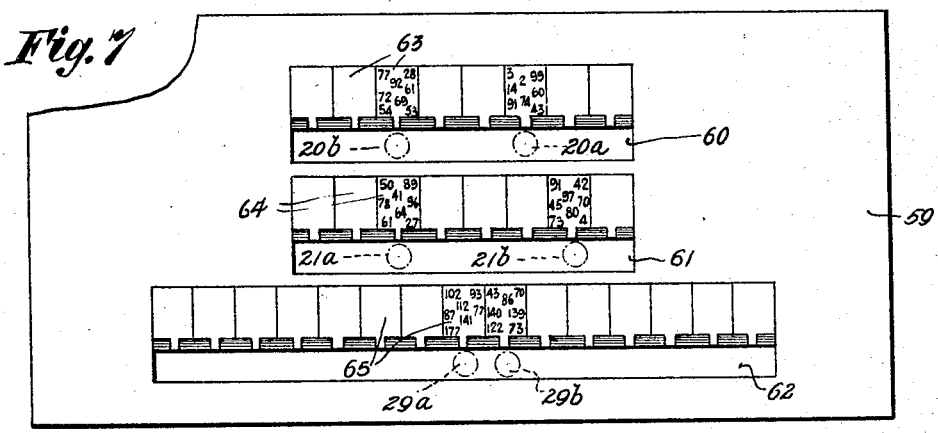
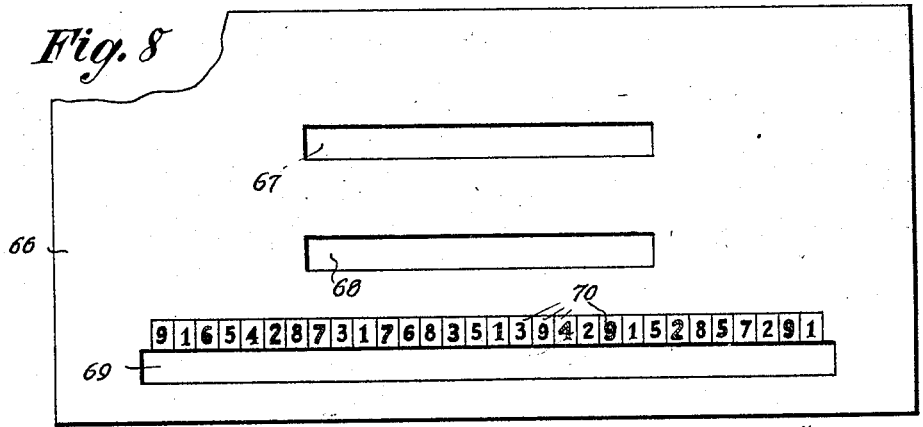

Patented Feb. 28, 1928.

1,660,501

UNITED STATES PATENT OFFICE.

MICHAEL S. GLEASON, OF NEW YORK, N. Y., ASSIGNOR TO ROWENA S. GLEASON, OF NEW YORK, N. Y.

EDUCATIONAL GAME APPARATUS.

Application filed September 3, 1927. Serial No. 217,358.

This invention relates to an educational device whereby arithmetical, geographical, or other facts may be taught to children in a highly entertaining manner.

Among the objects of the invention is to provide a game apparatus or system embodying mechanical and movable mechanism, the moving parts of which have a peculiar and constant correlation with one another and whereby as a result of the manipulation of the movable parts a wide range of results or series of results or manifestations may be produced and observed by the operators or players.

Another object of the invention is to provide a casing or cabinet having a face plate or panel provided with a plurality of slots, and within the casing is provided mechanism including finger pieces movable along several slots, and signal means, preferably of an electrical nature, caused to be made manifest according to the predetermined manipulation of the movable parts along the slots for the indication of any one of a number of distinct effects, conditions, or problems associated with one or more interchangeable charts co-operating with the panel having the slots.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a plan view of a preferred embodiment of the invention and illustrating the mechanism in connection with a chart calculated to illustrate computations in addition or subtraction.

Fig. 2 is a vertical longitudinal section on the line 2—2 of Fig. 1.

Fig. 3 is a horizontal section on the line 3—3 of Fig. 2.

Fig. 4 is a fragmentary plan view of the lower portion of the casing and with the movable mechanism arranged therein in a different position from that of Fig. 3.

Fig. 5 is an enlarged sectional detail on the line 5—5 of Fig. 2.

Figs. 6, 7, and 8 are diagrams of several modifications of charts adapted for use severally in place of the one shown in Fig. 1.

Referring now more particularly to the drawings, I show my improvement embodied in mechanism comprising a casing 10 in the nature of a shallow rectangular box having two compartments 11 and 12, the latter being at one end of the casing. The partition 13 separates the two compartments from each other. The casing includes also a cover or panel 14 supported in any suitable manner in the casing as upon a series of posts 15 fixed in the corners of the main compartment 11. The panel 14 may be either fixed in the casing or removable readily therefrom. This panel is shown provided with a series of parallel slots 16, 17, and 18 of equal length and practically co-extensive in length with the panel 14. The material of which the casing and its cover panel are made may be anything suitable. preferably of a non-conducting or insulating nature, and extending along the inner surface of one of the slots, as 16, are one or more bus bars 19. The other two slots have no conducting material associated therewith.

Mounted in the panel 14 and slidable along any two of the slots, as 16 and 17, are a pair of knobs 20 and 21 each provided with a pointer projecting laterally therefrom above the panel. These knobs or slides, while connected to each other as a pair, are nevertheless individually freely movable along their respective slots 16 and 17, each independently of the other. At least one of these knobs, as 20, consists of or includes conducting material and is in contact with the bus bars 19 along the inner side of the panel 14 as shown at 22. The slides 20 and 21 are connected to each other by any suitable bendable or jointed mechanism so as to allow the independent adjustment or sliding movement of the knobs as aforesaid and to constitute a carrier for a contact or registering point 23 which always lies at the center of a straight line connecting the axes of the knobs 20 and 21 irrespective of the movement of the knobs with respect to each other and the panel that supports them. Said point 23 consequently always lies or moves in or along a line 24 which is shown as midway between the slots 16 and 17 and parallel to the slots. The preferred means for constituting this connection between the knobs and the contact point is a system of lazy tongs 25 and 26. The bars or links 25 of the system are all of the same size and length and are jointed to one another at their mid points 27 and the end members of these links 25 are pivoted to the short links 26, the links 26 being one-half the length of those at 25, and the ends of the links 26 are pivoted to the knobs 20 and 21.

Fixed within the rear portion of the casing and supported suitably thereby is a post 28 which is paired with a slide or knob 29 having a downwardly projecting post 30, the knob 29 and post 30 being slidable along the third slot 18 independently of the other two slides or knobs. The fixed post 28 is located at any convenient point but preferably about midway of the length of the compartment 11. Extending between the fixed and movable posts just described is another system of lazy tongs 25ª and 26ª shown as substantially similar in construction to the system between the knobs 20 and 21. These latter mentioned lazy tongs constitute a carrier for a contact point 31 mounted preferably as shown in detail in Fig. 5 within a shell 32 and normally spring pressed upward or toward the other contact point 23 by means of a spring 33 housed between the contact 31 and the head 34 of the center pivot pin 27ª. For the purpose of description it will be observed that the lazy tongs 25 and 26 lie and operate along a horizontal plane parallel to and close below the inner surface of the panel 14, the contact point 23 carried thereby extending downward to the line 24. The lazy tongs 25ª and 26ª lie and operate in a plane likewise parallel to the panel 14 but materially below the plane of the other lazy tongs, and the registering point 31 carried thereby extends upward and moves along or lies in the same line 24 so that the two registering points 23 and 31 are adapted to contact at any point along the line 24 according to the manipulation or adjustment of the sliding knobs 20, 21, and 29. As shown, the contact 31 is in the mid point of a line joining the fixed and movable members 28 and 30. For the purposes of adjustment and manipulation of the knobs and contact points, the pivot connections between the links 26 and 26ª and their respective carriers or slides is central thereof, but as shown at 28ª, the links 26ª adjacent to the fixed support or post 28 are eccentric thereto, and so by simple rotational adjustment of the post 28, the second described system of lazy tongs may be accurately adjusted or tuned so as to insure proper co-operation of the contact points along the line 24.

Associated with the manually adjustable mechanism just described is any suitable signal or indicator mechanism, the principal parts of which are housed within the smaller compartment 12 of the casing. As shown, this system comprises a visible indicator or lamp 35 and an audible alarm or indicator as a bell 36 both in the same circuit in which is located a normally open switch 37. One line 38 leads from the battery 39 and is connected to the bus bars 19 at 40. The other line 41 from the battery leads through the audible and visible signal mechanism, either or both of which may be used, and is attached to the metal post 28 at 42. The lazy tongs and contact points are of conducting material and so when the points 23 and 31 come together at any point along the line 24, the circuit is closed at such point and if the manual normally open switch 37 is then pressed by the operator's thumb or finger, the signal will be made manifest. One or both of the contact points 23 and 31 are somewhat rounded and by virtue of the spring 33, they are permitted to ride with substantial freedom one over the other so as to make the contact and yet without material resistance.

The compartment 12 is shown provided with a lid or cover 12ª having a knob 12ᵇ for lifting it, and adjacent to or over the lamp 35 is a peep hole or window 35ª so that the light or glow from the lamp may be observed without lifting the cover.

The panel 14 or cover for the main compartment is preferably recessed or dropped down far enough below the upper edge of the casing to provide a seat at 43 for an index sheet or chart coextensive with the length and width of the panel 14 upon which it rests. This chart is shown in Figs. 1 and 2 as consisting of a sheet of bristol board 44 or its equivalent provided with a series of three slots 45, 46, and 47 corresponding to the panel slots 16, 17, and 18, respectively, but preferably of greater width than the panel slots, and the first two of the chart slots are shorter than the third. The chart being made to fit the seat 43 or otherwise held will always occupy a precise position with respect to the instrument or apparatus and especially the several knobs or slides 20, 21, and 29 which project upward freely through the chart slots and along which they are manually movable. The chart 44 is illustrated to exemplify the processes of addition and subtraction in connection with groups of dots somewhat similar or analogous to the design of common dominoes although the figures borne by the chart cary forward the domino idea. More definitely stated, along the slot 45 is shown a field 48 consisting of eleven blocks 48ª of characters, the blocks being of symmetrical size and arrangement along one edge of the slot 45. The field is provided along the slot with a colored margin broken at several places one for each block for co-operation with the pointer of the knob 20. Along the slot 46 is a duplicate field 49 having similar blocks 49ª and having similar means for co-operation with the pointer of the knob 21. These several groups or series of blocks 48 and 49 are shown as numbered from blank to 10 in order. I wish it to be observed, however, that they might otherwise be numbered or depicted. Along the slot 47 is a field 50 comprising twenty-one blocks 50ª numbered in succession from blank to 20 and having a series of indexes or leaders for co-operation with the pointer of the knob 29 movable therealong. These broken margins of the numeral fields are indicated in blue although black or any other color might be employed.

The fields 48 and 49 are symmetrical with reference to the center of the main compartment 11 of the casing and panel 14 which supports the chart. Likewise the field 50 is symmetrical with the chart and panel. With the construction made and assembled as above described in detail, if it be desired to illustrate computations in addition or subtraction, the following procedure may be used: For addition, the numbers in the panels 48 and 49 may be thought of as addends and those in the field 50 as the sum, or if subtraction be thought of, either shorter field might be regarded as the subtrahend and the other the remainder, while the longer field 50 is the minuend. For an example in addition and as shown in Fig. 1, if 9 and 3 are to be added, one of the knobs 20 or 21 will be moved to point to one of these addends, and the other knob will point to the other. Then by movement of the knob 29 along the third field, the number corresponding to the desired sum may be found, and when found the correctness is proved by closing the switch 37, producing a visible or audible signal or both. Using the same adjustment to illustrate subtraction, if it be desired to subtract 3 from 12, the knob 29 is adjusted to indicate the minuend, the knob 21 will be adjusted to indicate the subtrahend, and then by moving the knob 20 along the first mentioned field as the remainder, the answer may be determined and proved by the signal mechanism above mentioned. For the carrying out of the subtraction feature and regarding the field 50 as the minuend, it will be noted that in the illustration given not all the blocks would be appropriate, but certainly any number in the second field might be subtracted from any equal or larger number found along the first portion of the field 50 and the answer would be found as above described in the first field. Furthermore, the failure on the part of the player or experimenter to cause the signal to be made manifest when an attempt is made to subtract a larger number from a smaller number will be an indication to him that such computation can not be done arithmetically.

The charts or cards shown in Figs. 6, 7, and 8 are all interchangeable with one another and the chart at 44, they all being of the same size and form. Likewise all the charts are provided with slots for the reception and movement of the knobs 20, 21, and 29. The slots 51 and 52 of the chart 53 are of the same length as the third slot 54. In other words, the knobs 20 and 21 will be understood as movable along these slots 51 and 52 respectively as far as the knob is movable. Carrying out this illustration, along the slots are arranged a series of fields 55, 56, and 57, all subdivided similarly into blocks for correlated data of any suitable nature, either geographical, historical, or otherwise. For example, along the blocks 55 may be printed or written a series of names of cities, along the blocks 56 may be names of different States in which the respective cities first mentioned may be found, and in the last series of blocks are printed or inscribed in any suitable manner either permanently or interchangeably a corresponding series of facts to be taught about the cities aforesaid. It is to be noted, however, that for each block in any series is provided a leader as at 55ª or break in a colored margin 58 with which the several pointers or knobs must be made to coincide precisely in the carrying out of the program. Dotted lines show, for instance, at 20ª, 21ª, and 29ª, the positioning of the several adjustable knobs in order to produce a signal result corresponding to the fact indicated, as "St. Augustine, Florida, is the oldest city in the U. S. A." The leads or breaks 55ª are variously positioned with respect to the centers of the several blocks, and these breaks are charted according to the construction of the machine or apparatus so as to make the correlated groups of facts pertinent and exclusive. The dotted circles at 20ᵇ, 21ᵇ, and 29ᵇ are employed to show a different adjustment of the knobs or illustration. Similar showing of the knobs is made in Fig. 7 wherein the chart 59 is provided with three slots 60, 61, and 62 corresponding approximately to those shown in the first figure, but along these several slots are series of groups or blocks of numbers 63, 64, and 65 respectively. This adaptation of the invention is calculated for more advanced experimenters or players and requires the exercise of more mental development than in the first illustration. For example, assuming that the mechanism is so adjusted that the knobs will be located at 20ª, 21ª, and 29ª, the signal being made manifest at such time, among the players the one will be declared the winner who is able to point out first which numbers of the blocks 63 and 64 so indicated will, when added together, equal one of the numbers in the block 29ª. It will of course be understood that the several blocks or groups of numbers must be correlated to one another and to the signal mechanism of the apparatus so that when the signal is obtained it will be possible to select numbers from the first two series of blocks whose sum will be found in the one block at 65.

Fig. 8 shows a chart for a modified use of the device. In this case the chart 66 has several slots 67, 68, and 69 corresponding to the several slidable knobs and along which the knobs are movable or adjustable as before described. The first two slots are unidentified as to names or characters, but along the third slot is a row or field 70 of numbers, the numbers being variously selected and written or printed in different colors as, for example, black, green, and red, and staggered as to numerical value. The operation or manipulation of this feature of the apparatus or game smacks of chance, and while it, as well as the others, may be played or manipulated in various ways, for an example, one player or contestant, after adjusting the knobs 20 or 21 anywhere along the slots 67 or 68, will then adjust the knob 29 along the last slot while holding his finger on the switch 37. When the signal is made manifest, the pointer of the knob 29 will indicate a certain numeral along the series 70. If this numeral is black, the player will count the numerical value thereof for game. If the number indicated is red, the player loses the number shown, while if the indicated number is green, the player counts the value of it for game and wins another turn. Inasmuch as the practice of this feature of the game is likely to result in the indicator 29 coming opposite the division line between two numbers, the rules may provide that the player will be entitled to his choice of the adjacent numbers. This, however, is only a suggestion of one of the numerous rules or regulations that may be worked out for the exemplification of the chart.

Without unnecessarily limiting the construction, it is to be observed that as illustrated the slots 16, 17, and 18 are equidistant from one another, a distance equal to that of the slot 16 from the fixed metal post 28. Consequently the line 24 lies in a plane midway between the slots 16 and 17 and perpendicular to the plane thereof. It may also be noted that the slots overlap or lie one above the other so that the space on the chart may be utilized to the best advantage and the interrelationship of the various items on the chart may be readily apparent.

I claim:

1. In game apparatus, a casing having a plurality of parallel slots through one wall thereof, a like plurality of pointers movable severally and manually along said slots independently of one another, two of said pointers being paired with each other, while a third pointer is correlated to said pair for indicating a predetermined fact, and a plurality of different charts having various schedules of related data, said charts being adapted interchangeably for use in connection with the casing and having slots registering with the slots in said casing and through which the pointers operate.

2. Game apparatus as set forth in claim 1 in which the pair of pointers and supporting means therefor constitute a contact carrier, the slots and pointers being so constructed as to cause the contact to move along a predetermined fixed line, and a contact device associated with the third pointer and so supported as to move along the same predetermined fixed line, the two contacts being adapted to meet at some point along the line.

3. In game apparatus, a casing having a seat adapted to support a panel, an inscription chart supported upon said panel and adapted to be held in fixed position upon said panel, said panel and chart being provided with registering openings, a signal apparatus, a pair of pointers movable along a portion of said registering openings for indicating correlated facts on the chart, a third pointer movable along a third pair of registering openings, said facts on the chart and said pointers having such correlation that the position of the third pointer is required to be adjusted according to the relative positions of the other two pointers with respect to each other and the characters on the chart along which they move in order to operate the signal apparatus.

4. Mechanism as set forth in claim 3 in which there are provided two contact devices relatively movable to each other and adapted in a predetermined position of the pointers aforesaid to engage each other.

5. Mechanism as set forth in claim 3 in which there are provided two contact devices relatively movable to each other and adapted in predetermined position of the pointers aforesaid to engage each other, and signal mechanism adapted to be operated when said two devices contact each other.

6. Game apparatus comprising a series of three pointers movable independently and manually along predetermined lines, supporting means comprising a system of lazy tongs for two of said pointers, a signal contact device carried by said lazy tongs between the two pointers supported thereby, said contact device provided with means for guiding the same along a predetermined line, supporting means for the third pointer, a second signal contact device carried by the last mentioned supporting means and guided thereby along a predetermined line coincident with the movement of the third pointer, the two contact devices being adapted to engage each other at a predetermined adjustment of the three pointers, and signal means adapted to be operated as a result of the contact of said two contact devices.

7. Mechanism as set forth in claim 6 in which the supporting means for the third pointer is a system of lazy tongs pivotally supported at one end upon a fixed support.

8. Mechanism as set forth in claim 6 in which said contact device carried on the lazy tongs is at a mid position between the two pointers supported thereby.

9. Mechanism as set forth in claim 6 in which the contact devices are movable along the same line.

10. In game apparatus, a series of three pointers movable independently of one another along predetermined parallel lines, supporting means for two of said pointers as a pair, a signal contact device carried by said supporting means between the two pointers supported thereby, supporting means for the third pointer comprising a system of lazy tongs, the pointer being attached to one end of the system, a fixed support for the other end of the system, and a signal contact device carried by the lazy tongs between the fixed support and the pointer carried thereby, said contact devices being adapted to engage each other at a predetermined adjustment according to the positions of the three pointers.

11. Mechanism as set forth in claim 10 in which the contact devices are movable constantly in the same line.

12. Mechanism as set forth in claim 10 in which the fixed support for one end of the lazy tongs is rotationally adjustable and the lazy tongs are connected thereto eccentrically for the accurate adjustment of the system.

13. In an educational apparatus a casing having at least three parallel slots through one wall thereof, a removable chart having slots corresponding to the slots in the casing, a pointer movable in each slot, a registering device, means for connecting said registering device with two of said pointers so that the same will move along a straight line when either of said pointers is moved, a second registering device, means for connecting said second registering device with a third pointer so that it will move along a line adjacent the path of the first registering device when such third pointer is moved, data carried by said chart so positioned that when all three pointers point towards interrelated items, said two registering devices will be in registration, and means for ascertaining whether said two devices are in registration.

14. An apparatus as set forth in claim 13 in which the means connecting the first registering device with two of the pointers comprises a system of lazy tongs.

15. An apparatus as set forth in claim 1 in which the means connecting the first registering device with two of the pointers comprises a system of lazy tongs and the means connecting the second registering device with the third pointer comprises a system of lazy tongs pivotally supported at one end.

16. In a device of the type described a frame having three parallel and overlapping slots, a member movable in each of said slots, a registering device, links for connecting said registering device with two of said members so that when either of said members is moved said registering device will move along a path defined by a single line, a second registering device and links for connecting said second registering device with the third of said members so that when said third member is moved said second registering device will move along a path similar to and adjacent the path of the first registering device.

In testimony whereof I affix my signature.

MICHAEL S. GLEASON.